United States Patent [19]

Yamashita

[11] Patent Number: 5,258,045
[45] Date of Patent: Nov. 2, 1993

[54] ROUTE SELECTOR FOR SHEETLIKE ARTICLE

[75] Inventor: Miyuki Yamashita, Tokyo, Japan

[73] Assignee: Hirakawa Kogyosha Co., Ltd., Tokyo, Japan

[21] Appl. No.: 842,555

[22] Filed: Feb. 27, 1992

[30] Foreign Application Priority Data

Jun. 24, 1991 [JP] Japan .................. 3-178837

[51] Int. Cl.$^5$ .......................... B65H 5/06
[52] U.S. Cl. ..................... 271/225; 271/184; 271/902; 271/304
[58] Field of Search ............... 271/225, 184, 186, 902, 271/304

[56] References Cited

U.S. PATENT DOCUMENTS

| 4,579,325 | 4/1986 | Pinckney | 271/902 X |
| 4,918,490 | 4/1990 | Stemmle | 271/291 X |
| 4,958,828 | 9/1990 | Saito | 271/902 X |
| 5,049,947 | 9/1991 | Fish | 271/902 X |

Primary Examiner—Richard A. Schacher
Attorney, Agent, or Firm—Oblon, Spivak, McClelland, Maier & Neustadt

[57] ABSTRACT

A route selector for a sheetlike article comprises an delivery path for feeding the sheetlike article, a pair of feed rollers located at the end of the delivery path, and a first and a second discharge paths separated by the feed rollers. The feed rollers are arranged so that a line connecting the central axes of rotation of the feed rollers is inclined with respect a line which is perpendicular to the sheet feeding direction. The feed rollers are rotatable forwardly and backwardly, determining the directions to which the sheetlike article is conveyed.

6 Claims, 4 Drawing Sheets

ROUTE SELECTOR FOR SHEETLIKE ARTICLE

BACKGROUND OF THE INVENTION

1. Field of the Invention

This invention relates to a route selector for changing a route to feed a sheetlike article such as a photosensitive film or a copying paper in a process camera, a copying machine and so forth.

2. Description of the Related Art

With an automated process camera, an exposed photosensitive member is carried to an automatic processor to be developed. The photosensitive member is coated with a photosensitive emulsion on one side thereof, being carried with the photosensitive side facing downwardly or upwardly to be applied a developer. In some cases, the photosensitive member is coated with the photosensitive emulsion on each side thereof to be applied the developer.

Usually, the photosensitive member for the process camera is coated with photosensitive emulsion on one side thereof. There will be no problem so long as such photosensitive member is being conveyed to a developing station as specified. When the photosensitive member is relatively thick and rigid for the direct plate making, only one side of the photosensitive member is coated with the photosensitive emulsion to facilitate maintenance work and to reduce a manufacturing cost.

With an automated process camera for book composition, the photosensitive member is exposed through its photosensitive side. In some cases, the photosensitive member is however exposed through its rear, i. e. non-photosensitive, side to produce a reversed image. The photosensitive member is differently developed depending upon whether it is exposed through its photosensitive or non-photosensitive side. Sometimes, the photosensitive member has to be reversed before it is carried to the developing station. Further, if a developer of an automatic processor is not compatible with the photosensitive member, the photosensitive member is bypassed to a roomlight carrier to be stored. Then, the roomlight carrier storing the photosensitive member is conveyed to a developing station where the photosensitive member can be developed.

FIGS. 5a and 5b show one example of route selectors for selecting a route to carry the sheetlike photosensitive member. The route selector has a flap 81, which is positioned in a feed path 80. The flap 81 is moved up as shown in FIG. 5a, or down as shown in FIG. 5, thereby selecting the route for the sheet-like article.

This conventional route selector however cannot reverse the feeding direction of the sheetlike article as desired. Therefore, the route selector is not applicable to reverse the feeding direction of the photosensitive member in a feed path between an automatic processor and a process camera.

SUMMARY OF THE INVENTION

It is therefore an object of this invention to provide a route selector for facilitating reversal of the feeding direction of a sheetlike article, selecting a route for the sheetlike article, or temporarily storing the sheetlike article on the way in a feed path as desired according to various developing requirements.

DETAILED DESCRIPTION

Figure 2:
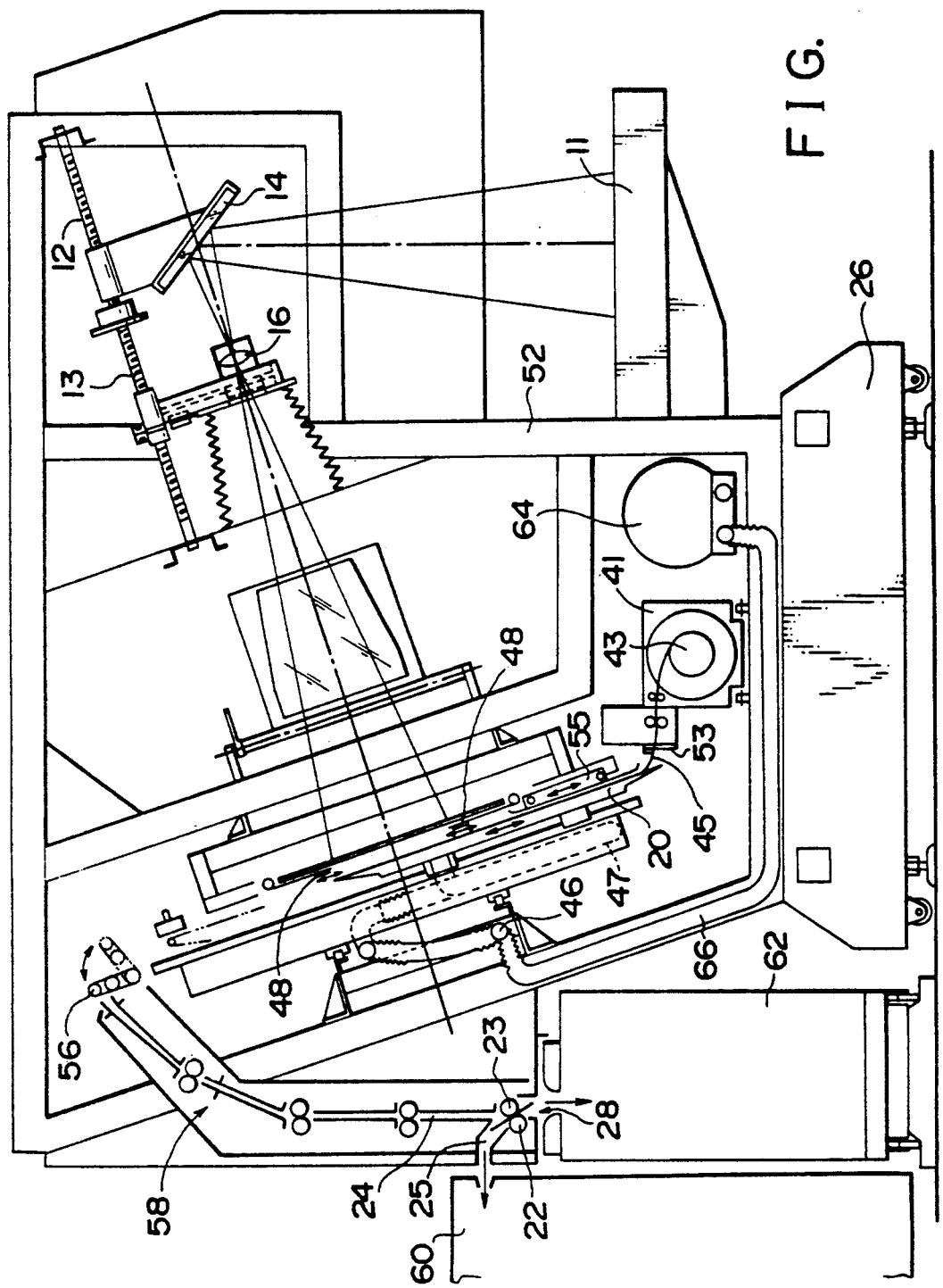
FIG. 2 is a front sectional view of a process camera including the route selector of FIG. 1.

FIG. 2 shows the configuration of a process camera incorporating a route selector according to the invention. The process camera itself is the same as that disclosed in the co-pending Japanese Utility Model Application 105079/1990. In FIG. 2, reference numeral 11 stands for an original table, which extends horizontally from an outer surface of a camera housing 52 to receive an original thereon.

A mirror 14 is positioned above the original table 11 to laterally deflect light from the original. The mirror 14 is supported by a feed screw 12. The feed screw 12 is rightwardly and upwardly tilted with respect to the horizontal plane as shown in FIG. 2. A lens 16 and a platen 20 are arranged (in the named order) in a path to pass the light reflected by the mirror 14 from the original table 11. The lens 16 is supported by a feed screw 13 on extension of the feed screw 12. The feed screw 13 is tilted similarly to the feed screw 12.

The greater part of the camera housing 52 serves as a dark room. The original table 11, mirror 14 and lens 16 are positioned outside the dark room. The lens 16 is coupled to the dark room via bellows. The platen 20 is located in the camera housing 52, positioning a relatively large film piece as the sheetlike article by use of an air suction unit.

With the process camera, a stand 26 supports all the components including the original table 11, mirror 14, lens 16 and platen 20. The original table 11 and mirror 26 project from one side of the stand 26, while the platen 20 is located on the stand 26 at a position opposite to the original table 11 and the mirror 16. The platen 20 is tilted with respect to the vertical plane so that its upper end is inclined outwardly from the stand 26. The optical path between the mirror 14, lens 16 and platen 20 is also inclined in response to the platen 20, so that the central axis of the optical path is perpendicular to the platen 20. The two feed screws 12, 13 are inclined in parallel to the optical path.

The platen 20 is moved in the directions of X- and Y-axes (the Y-axis is perpendicular to the X-axis) by an X-axis driver 46 and a Y-axis driver 47. The movement of the platen 20 in the X- and Y-axis directions is controlled by non-illustrated feed screws which are operated by stepping motors.

Being much heavier than the original stand 11 and mirror 14, the platen 20 and drivers 46, 47 are relatively positioned as described above to balance the weight applied to the stand 26.

Masking plates 48 are positioned just in front of the film holding surface of the platen 20, including left, right, upper and lower plates. These four masking plates 48 are independently moved to determine the size of an aperture in the X and Y directions of the platen 20. In the camera housing 52, a cassette 41 containing a film roll 43 is disposed near the lower end of the platen 20. The film roll 43 is pulled out from the cassette 41, being cut by a cutter 53 into a film 45 of a preset length.

A conveyor 55 is located in front of the platen 20 to convey the film 45 to the platen 20. The conveyor 55 keeps the film 45 attracted thereto, moving up and down along the platen 20 to deliver the film 45 to a predetermined position of the platen 20. An air suction pump 64 is positioned beside the cassette 41, sucking air through grooves on the platen 20 via a suction pump 66 to attract the film 45 to the surface of the platen 20. The conveyor 55 can also keep the film 45 attracated thereto.

A catcher 56 is positioned above the platen 20 to have the used film 45 sandwiched by roller pairs. The catcher 56 is vertically movable in two positions, i.e. a position to receive and sandwich the used film 45, and a position to deliver the sandwiched film 45 to a feed path 58. The feed path 58 is used to carry the film 45 downwardly, including roller pairs disposed at predetermined spaces, and guide plates located at the spaces between these roller pairs.

The end portion of the feed path 58 is called as a delivery path 24, extending to a pair of feed rollers 22, 23. Near the end of the delivery path 24, there are a first discharge path 25 and a second discharge path 28, which are separated by the feed roller pairs 22, 23. The first discharge path 25 is near the delivery path 24, being located at one side of the feed roller pairs 22, 23, and extending to a processor 60 including a developing station. The second discharge path 28 is at the other side of the feed roller pairs, extending to a roomlight carrier 62.

Figure 1:
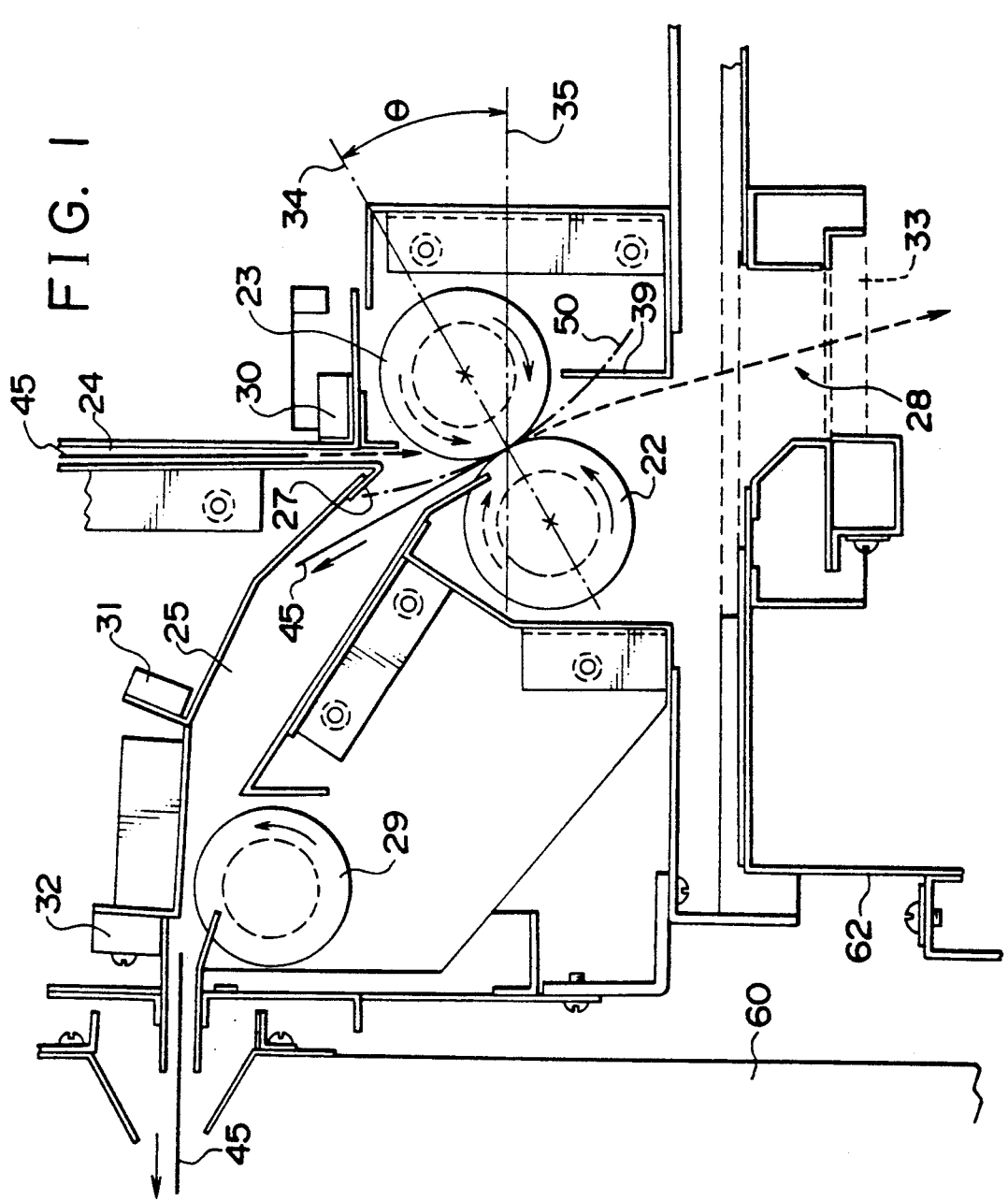
FIG. 1 is a front sectional view of a route selector for selecting a route of a sheetlike article according to an embodiment of the invention.

FIG. 1 shows the detailed configuration of the units near the feed roller pairs 22, 23. As shown in FIG. 2, the feed roller pairs 22, 23 are positioned so that they are in contact with each other at the lower end of the delivery path 24. Specifically, these roller pairs 22, 23 are arranged so that a line 34 connecting their central axes of rotation is inclined by an angle $\theta$ with respect to a line 35 perpendicular to the delivery path 24. The roller pairs 22, 23 are reversible in their rotating directions. The roller pairs 22, 23 are rotated in the direction to receive between them the film 45 passing via the delivery path 24, so that the film 45 is conveyed toward the second discharge path 28. A sensor 30 is positioned at the end of the delivery path 24 to detect passage of the film 45. According to a signal indicating the passage of the film 45, the roller pairs 22, 23 are stopped to temporarily reserve the film 45 sandwiched between them.

Since the line 34 is inclined by the angle $\theta$ with respect to the line 35 as described above, the film 45 sandwiched by the roller pairs 22, 23 is inclined to be perpendicular to the line 34. Specifically, the tangent at the contact area of the roller pairs 22, 23 is inclined with respect to the feeding direction of the film 45, so that the film 45 is curled as shown by a chain line 50, being also inclined in response to the angle $\theta$. The leading end of the film 45 faces toward the first discharge path 25, while the trailing end of the film 45 faces toward the second discharge path 28. A dividing guide 27 is positioned between the delivery path 24 and the first discharge path 25. When the film 45 sandwiched by the roller pairs 22, 23 is inclined according to the angle $\theta$, the leading end of the film 45 is displaced toward the first discharge path 25 at the dividing guide 27. On the other hand, since the trailing end of the curled film 45 is displaced from the second discharge path 28, a regulating plate 39 is used to compensate for such displancement of the trailing end of the film 45.

When the roller pairs 22, 23 are reversely rotated, the film 45 is conveyed to the processor 60 via the first discharge path 25. On the contrary, when the roller pairs 22, 23 are forwardly rotated further, the film 45 is carried to the room light carrier 62 via the second discharge path 28. The room light carrier 62 has an automatic shutter 33 which is opened only to receive the film 45. The first discharge path 25 has a buffer sensor 31 in its middle, and an exit sensor 32 and a discharge roller 29 at an end thereof.

It is assumed that the roller pairs 22, 23 are rotated in the direction to receive the film 45 between them. The film 45 conveyed via the delivery path 24 under this condition is guided between the roller pairs 22, 23. When the sensor 30 knows passage of the film 45 via the delivery path 24, the roller pairs 22, 23 are stopped to keep the film 45 sandwiched between them. The roller pairs 22, 23 are reversely rotated to carry the film 45 to the processor 60. Then, the film 45 is carried to the processor 60 by the discharge roller 29 via the first discharge path 25. If the operation speed of the processor 60 is slower than the feeding speed of the film 45, the film 45 is sandwiched between the roller pairs 22, 23 to be in a standby mode as described above. When the preceding film 45 is processed, the roller pairs 22, 23 are reversely rotated to feed the standby film 45 to the processor 60.

With the process camera of FIG. 2, when it has a photosensitive side on its front surface, the film 45 is carried via the delivery path 24, being changed its feeding direction by the reverse rotation of the roller pairs 22, 23, and being conveyed to the processor 60 via the first discharge path 25. Under this condition, the film 45 has its photosensitive side facing upwardly. Therefore, the processor 60 should be suitable to process such film 45 whose photosensitive side is upward.

Otherwise, the roller pairs 22, 23 should be rotated to feed the film 45 to store it in the room light carrier 62. The room light carrier 62 is then conveyed to a developing station which can process the foregoing film 45. For this purpose, the rotation and stop of the roller pairs 22, 23 are controlled by a computer, a programmable processor or the like.

According to the foregoing embodiment, the film 45 is conveyed either to the processor or the room light carrier depending upon the rotating direction of the feed roller pairs 22, 23. Specifically, the feeding direction of the film 45 is reversed when it should be fed via the first discharge path 25. On the contrary, the film 45 is fed via the second discharge path 28 without reversal of the feeding direction.

Figure 3:
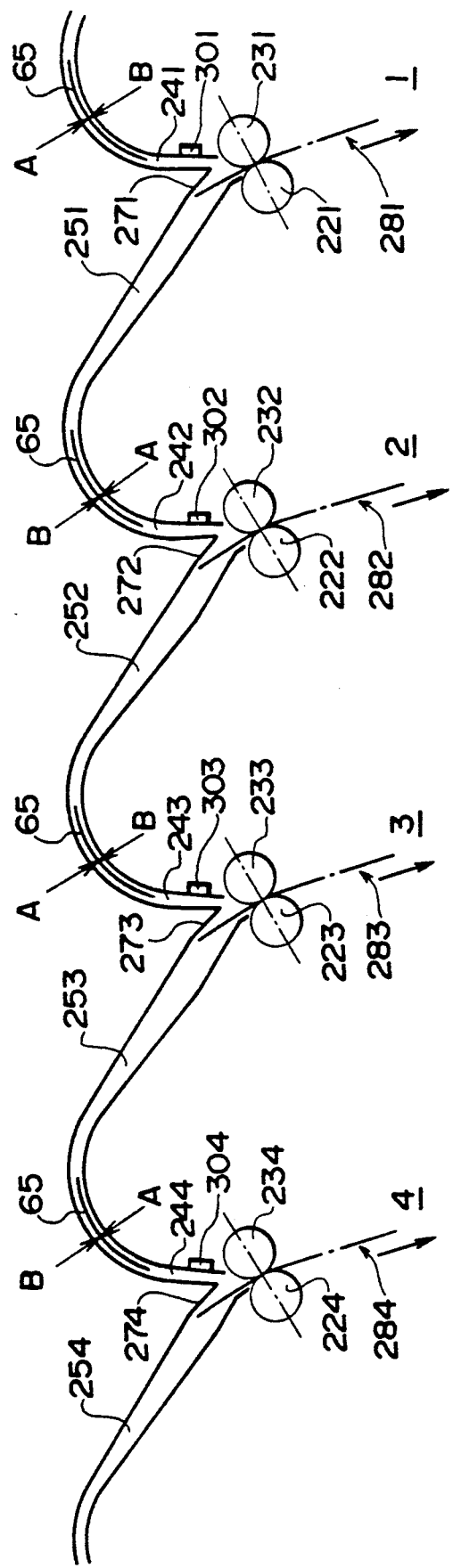
FIG. 3 is a front sectional view of a modified example of the route selector of FIG. 1.

Arranged in series, a plurality of the route selectors of this invention can be also serve as a document searcher or sorter. FIG. 3 shows serial arrangement of four route selectors of the invention. A first route selector 1 includes a feed roller pair 221, 231, an delivery path 241, a first discharge path 251, a second discharge path 281, a dividing guide 271, and a sensor 301. The second and fourth route selectors 2, 3, 4 similarly and respectively include roller pairs 222, 232, 223, 233, 224, 234, delivery paths 242, 243, 244, first discharge paths 252, 253, 254, second discharge paths 282, 283, 284, dividing guides 272, 273, 274, and sensors 302, 303, 304. In FIG. 3, letter A stands for a front side of the sheetlike article 65, and B a rear side thereof.

It is assumed that the sheetlike article 65 whose front side A faces upwardly is conveyed through in the first route selector 1. The sheetlike article 65 is respectively reversed by the first to the fourth route selectors 1 to 4. Specifically, the sheetlike article 65 is conveyed via the first discharge paths 251, 252, 253, 254 with its front side facing downwardly, upwardly, downwardly and upwardly, respectively. When the front or rear side of the sheetlike article 65 is respectively detected by the first to fourth route selectors 1 to 4 to be respectively fed into the second discharge paths 281, 282, 283, 284, the route selectors 1 to 4 can be used to search or sort documents.

Figure 4:
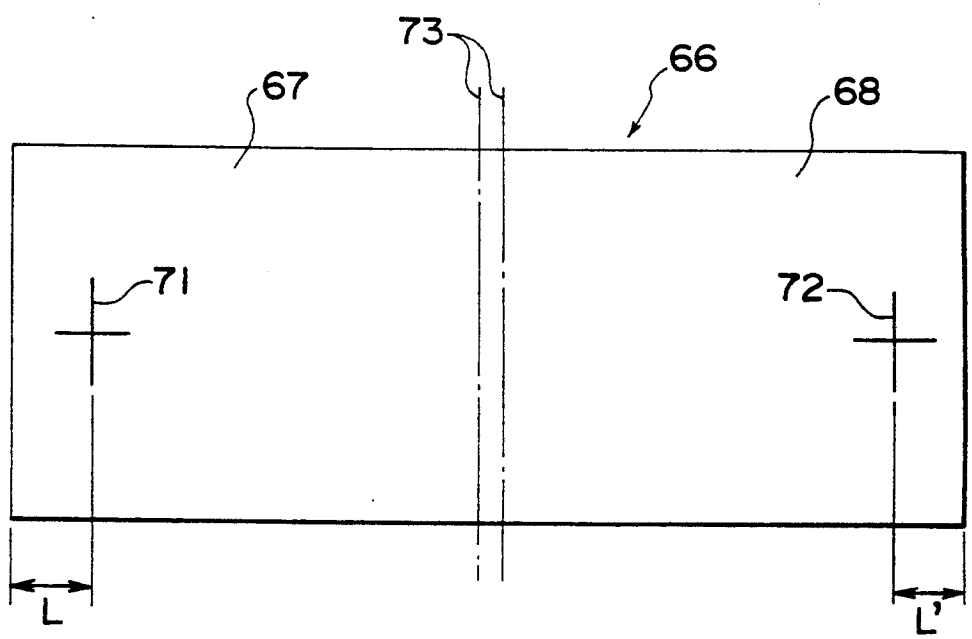
FIG. 4 is a front view showing dimensional parameters of a sheetlike article in the modified example of FIG. 3.
Figure 5A:
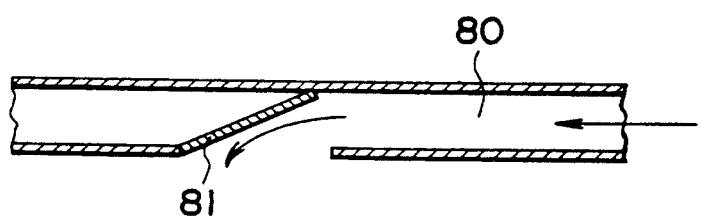
FIGS. 5a and 5b show one of conventional route selectors for selecting a route for a sheetlike article.
Figure 5B:
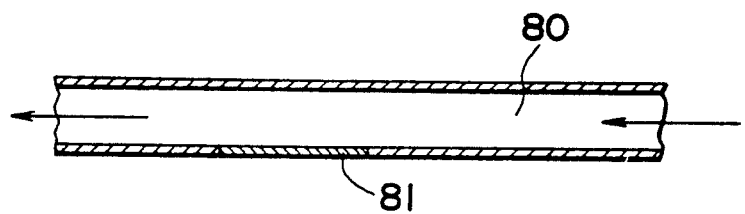

In the bookbinding process, it is sometimes necessary to cut a paper sheet 66 on which two pages 67, 68, for example, are printed as shown in FIG. 4. In such case, two reference positions 71, 72 are determined at lengths L and L' from each edge of the paper sheet 66, so that the paper sheet 66 is cut at lines 73. The route selectors of FIG. 3 are very useful for such purpose. Specifically, when the paper sheet 66 is being carried in a predetermined direction, the reference position 71 and the cut line 73 are determined from one end of the paper sheet 66. Then, the feeding direction of the paper sheet 66 is reversed to cut the paper sheet 66 after determining the reference position 72 and cut line 73 from the other end thereof.

The route selector of this invention can select two routes for the sheetlike article as desired, and is also applicable as a turner for reversing the feeding direction of the sheetlike article, a stacker for storing the sheetlike article temporarily, or a sorter for the sheetlike article.

According to the invention, the line connecting the central axes of rotation of the feed roller pairs is inclined with the line which is perpendicular to the feed path. The roller pairs are reversible in their rotating directions. The first and second sheet discharge paths are separated by the feed roller pairs. The forward or backward rotation of the roller pairs selects either the first or second discharge path to which the sheetlike article is conveyed. The sheetlike article sandwiched between the roller pairs is inclined according to the predetermined angle, being directed to either the first or second discharge path. When the roller pairs are stopped, the sheetlike article can be temporarily kept sandwiched between the roller pairs. It is also possible to reverse the feeding direction of the sheetlike article when it is to be conveyed to the first discharge path.

What is claimed is:

1. A route selector for a sheetlike article, comprising;
   (a) a delivery path for feeding the sheetlike article;
   (b) a pair of feed rollers located near the end of said delivery path, said pair of feed rollers being rotatable forwardly and backwardly, and being arranged so that a line connecting central axes of rotation of said pair of feed rollers is inclined with respect to a line which is perpendicular to the sheet feeding direction; and
   (c) a first discharge path and a second discharge path, wherein said pair of feed rollers are located at a junction of the delivery path, first discharge path and second discharge path, with said first discharge path and said second discharge path separated by said pair of feed rollers and wherein as a sheetlike article exits said delivery path said sheetlike article is received by said pair of feed rollers and thereafter fed to one of said first discharge path and said second discharge path which is selected according to a forward or backward rotation of said pair of feed rollers to convey the sheetlike article, said first discharge path being located near said delivery path, and said second discharge path being located opposite to said first discharge path via said pair of feed rollers.

2. A route selector according to claim 1, wherein a dividing guide is located between said delivery path and said first discharge path to separate said delivery path and said first discharge path.

3. A route selector according to claim 1, wherein said delivery path is communicated to a feed path for receiving an exposed film from a process camera.

4. A route selector according to claim 1, wherein said pair of feed rollers also serves to temporarily store the sheetlike article.

5. A plurality of route selectors for a sheetlike article, each said route selector comprising;
   (a) a delivery path for feeding the sheetlike article;
   (b) a pair of feed rollers located immediately downstream of an end of said delivery path, said pair of feed rollers being rotatable forwardly and backwardly, and being arranged so that a line connecting central axes of rotation of said pair of feed rollers is inclined with respect to a line which is perpendicular to the sheet feeding direction; and
   (c) a first discharge path and a second discharge path, wherein said pair of feed rollers are located at a junction of the delivery path, first discharge path and second discharge path, with said first discharge path and said second discharge path separated by said pair of feed rollers and wherein as a sheetlike article exits said delivery path said sheetlike article is received by said pair of feed rollers and thereafter fed to one of said first discharge path and said second discharge path which is selected according to a forward or backward rotation of said pair of feed rollers to convey the sheetlike article, said first discharge path being located near said delivery path, and said second discharge path being located opposite to said first discharge path via said pair of feed rollers, wherein each said first discharge path of each said route selector is communicated to a delivery path of an adjacent route selector.

6. A route selector for a sheetlike article comprising
   a delivery path for feeding a sheetlike article;
   a pair of feed rollers located near an end of said delivery path, said pair of feed rollers being rotatable forwardly and backwardly, and being arranged so that a line connecting central axes of rotation of said pair of feed rollers is inclined with respect to a line which is perpendicular to the sheet feeding direction at a location adjacent said pair of feed rollers;
   a first discharge path and a second discharge path which are separated by said pair of feed rollers and which are selected according to a forward or backward rotation of said pair of feed rollers to convey the sheetlike article, wherein said pair of feed rollers receives the sheetlike article from said delivery path; and
   wherein said feed rollers are located at a junction of said delivery path, said first discharge path and said second discharge path and said pair of feed rollers receives the sheetlike article between the pair of feed rollers as said sheetlike article exits said delivery path, and backward rotation of said feed rollers discharges said sheetlike article into said first discharge path and forward rotation of said feed rollers discharges said sheetlike article into said second discharge path.

* * * * *